(12) United States Patent
Zavislan

(10) Patent No.: US 6,710,875 B1
(45) Date of Patent: *Mar. 23, 2004

(54) IMAGING SYSTEM USING POLARIZATION EFFECTS TO ENHANCE IMAGE QUALITY

(75) Inventor: James M. Zavislan, Pittsford, NY (US)

(73) Assignee: Lucid, Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,795

(22) Filed: Aug. 18, 2000

Related U.S. Application Data

(63) Continuation of application No. 08/966,046, filed on Nov. 7, 1997, now Pat. No. 6,134,009.

(51) Int. Cl.$^7$ .................................................. G01J 4/00
(52) U.S. Cl. ..................... 356/364; 356/369; 600/473
(58) Field of Search ................................ 356/364–369, 356/450, 453, 487, 489, 491, 520; 250/225, 234, 235, 236; 359/386, 370, 385, 371; 600/473, 476

(56) References Cited

U.S. PATENT DOCUMENTS

| | | | |
|---|---|---|---|
| 2,074,106 A | | 3/1937 | Foster |
| 2,303,906 A | | 12/1942 | Benford et al. |
| 3,705,755 A | * | 12/1972 | Baer |
| 3,958,884 A | | 5/1976 | Smith |
| 4,241,257 A | * | 12/1980 | Koester ...................... 250/235 |

(List continued on next page.)

FOREIGN PATENT DOCUMENTS

| WO | WO-8807695 | 10/1988 |
|---|---|---|

OTHER PUBLICATIONS

Rajadhyak et al., "In Vivo Confocal Scanning Laser Microscopy of Human Skin: Melanin Provides Strong Contrast", The Society for Investigative Dermatology, Inc., vol. 104, No. 6, Jun. 1995, pp. 1–7.

Rajadhyak et al., "Confocal laser microscope images tissue in vivo", Laser Focus World, Feb. 1997, pp. 119–127.

(List continued on next page.)

*Primary Examiner*—Hoa Q. Pham
(74) *Attorney, Agent, or Firm*—Kenneth J. Lukacher; Martin Lukacher

(57) ABSTRACT

The quality of images produced by confocal microscopy, and especially scanning laser confocal microscopy, is enhanced especially for images obtained in turbid mediums such as many biological tissue specimens, by reducing speckle from scatterers that exist outside (above and below) the focal plane region which is being imaged by utilizing sheared beams, both of which are focused to spots in the focal or image plane (region of interest) and polarizing the beams to have opposite senses of circular polarization (right and left handed circular polarization). The return light from the image plane of certain polarization is detected after passing through the confocal aperture of the confocal microscope. Light from scatterers outside the region of interest, which are illuminated by both of the sheared beams, interfere thereby reducing speckle due to such scatterers, and particularly scatters which are adjacent to the image plane. Sheared beams having orthogonal linear polarization, as may be obtained from a Wollaston or Nomarski prism are converted into circularly polarized beams of opposite polarization sense by a quarter wave plate. The optical signals representing reflections from the focal plane are derived by polarizing optics which may either, be a polarizing beamsplitter in the incident beam path or with a retarder and analyzer. The retarder may be selected to provide different polarization phase shift of the return light, and with the analyzer, detects the degree of elliptical polarization representing the optical activity and circular dichroism producing the optical signal representing the image.

12 Claims, 4 Drawing Sheets

U.S. PATENT DOCUMENTS

| | | | |
|---|---|---|---|
| 4,975,217 A | | 12/1990 | Brown |
| 5,078,482 A | | 1/1992 | Feldman et al. |
| 5,386,317 A | | 1/1995 | Corle et al. |
| 5,625,613 A | | 4/1997 | Kato et al. |
| 5,699,160 A | | 12/1997 | Barenboim et al. |
| 5,710,631 A | | 1/1998 | Bou-Ghannam et al. |
| 5,764,363 A | | 6/1998 | Ooki et al. |
| 6,134,009 A | * | 10/2000 | Zavislan ................. 356/364 |
| 6,134,010 A | * | 10/2000 | Zavislan ................. 356/364 |
| 6,304,373 B1 | * | 10/2001 | Zavislan ................. 359/370 |

OTHER PUBLICATIONS

Lessor et al., "Quantitative surface topography determination by Nomarski reflection microscopy.I. Theory", J. Opt. Soc. Am., vol. 69, No. 2, Feb. 1979, pp. 357–366.

Schmitt et al., "Use of polarized light to descriminate short–path photons in a multiple scattering medium", Applied Optics, vol. 31, No. 30, Oct. 20, 1992, pp. 6535–6546.

Schmitt et al., "Optical characterization of dense tissue using low–coherence interferometry", SPIE vol. 1889 pp. 197–211.

Cogswell et al., "Confocal differential interference contrast (DIC) microscopy: including a theoretical analysis of conventional and confocal DIC imaging", Journal of Microscopy, vol. 165, Pt. 1, Jan. 1992, pp. 81–101.

* cited by examiner

IMAGING SYSTEM USING POLARIZATION EFFECTS TO ENHANCE IMAGE QUALITY

This application is a continuation of application Ser. No. 08/966,046, filed Nov. 7, 1997, now U.S. Pat. No. 6,134,009, issued Oct. 17, 2000.

The present invention relates to imaging systems which enhance image quality by reducing noise which reduces contrast in images especially images obtained from turbid media, such as encountered in biological specimens, and especially dermatological tissue wherein keratin is present. Media, which are turbid, may be characterized by having a high rms refractive index variation and high scattering cross sections.

The invention is especially suitable for use in confocal microscopy and especially in laser scanning confocal microscopes, such for example as the Vivascope confocal scanning laser microscope which is sold by Lucid Technologies, Inc. of Henrietta, N.Y., U.S.A. and described in an article by M. Rajadhyaksha, et al. entitled *"In Vivo Confocal Scanning Laser Microscopy of Human Skin, Melanin Provides Strong Contrast"* which appeared in the Journal of Investigative Dermatology, Volume 104, No. 6 pg. 1 (June 1995), and which is the subject matter of an article by M. Rajadhyaksha and James M. Zavislan which appeared in *Laser Focus World*, page 119, (Feb. 10, 1996), and in the hand held scanning laser microscope which is the subject matter of U.S. patent application Ser. No. 08/650,684 filed May 20, 1996 in the name of James M. Zavislan et al. The invention is also useful in optical coherence tomography or interference microscopy.

It has been discovered in accordance with the invention, that by illuminating a medium by beams having generally circular polarization in opposite senses (left and right handed circular polarization) images obtained from return light from an image plane or section within a specimen, by responding to circular dichroism and retardation, of the return light (circular dichroism and retardation is intended to include degrees of elliptical polarization), that image distortion, such a produced by scattering sites adjacent to the image plane or section, tends to be minimized or at least reduced to a constant value, while optical signals due to index variations and other optical activity within the image plane or section (region of interest) are actually detected. Thus correlated noise from scatterers, which produces optical distortion and especially speckle effects in the image, are reduced thereby enhancing the quality of the image. The focal region (image plane or section) may be at the surface of the specimen or embedded in the specimen. Noise due to scattering sites away from the focal region may occur, whether the region is at the surface or embedded in the specimen. The section being imaged, especially in imaging of biological tissue, is of the thickness of a cell, for example about five microns.

Regions adjacent to the section of interest may have an abundance of scatterers both behind and ahead of the section in the direction of propagation of the illuminating beam which is incident on the section. These potential scattering sources are illuminated by the same optical field that illuminate the region of interest. There is a finite probability that return light from these scatterers will pass through a confocal aperture and reach the detector as optical signals from which the image of the section of interest is constructed. The spurious return light may manifest itself as speckle in the image. The use of sheared circularly polarized beams, in accordance with the invention, has been found to reduce such distortion, and especially speckle distortion, thereby providing additional contrast and enhancing the image quality.

Laser scanning confocal microscopy provides image enhancement in that laser light beams are used, especially beams of a wavelength, such as in the infra-red range, which are maximally transmitted. The confocal aperture restricts the section which is imaged to the focal region. The probability, nevertheless exists that scattered light from regions away from the focal region will pass through the confocal aperture and produce noise, especially speckle, which distort and reduce contrast in the image which is detected. It has been proposed to use light restricted to one polarization state, but only for surface reflection reduction by eliminating the other polarization state. It has also been proposed to use sheared beams and differential interference contrast to enhance microscope images. Such beams have been obtained using Nomarski or Wollaston prisms and the technique of using such sheared beams has been referred to as Nomarski microscopy. See D. L. Lessor et al. *"Quantitative Surface Topography Determination by Nomarski Reflection Microscopy"*, Journal of the Optical Society of America, Volume 69 No. 2, pg. 357 (February 1979). Nomarski microscopy techniques have also been proposed for use in confocal microscopy. See C. J. Cogswell, *"Confocal Differential Interference Contrast (DIC) Microscopy"*, Journal of Microcopy, Vol. 165, Part I, pp. 81–101 (January 1992). Even with Nomarski techniques applied to confocal microscopy, noise distortion, which appears to emanate from scattering sites adjacent to the focal plane or image plane of interest, has not been minimized.

It is a feature of the present invention to further enhance image quality in imaging systems by utilizing circularly polarized beams focused on the image plane thereby obtaining noise reduction in the image, especially speckle noise which may be attributable to scatterers adjacent to the image plane.

The noise reduction system described herein has application to optical coherence imaging often referred to as optical coherence-domain reflectivity, optical coherence tomography or optical coherence microscopy. (See Schmitt et al, *Optical characterization of dense tissues using low-coherence interferometry*, SPIE, Vol. 1889, pps 197–211, July 1993.) In this imaging modality, a low-coherence source is used to illuminate a interferometer with a phase-modulated reference arm and a sample arm. In the sample arm a focussing objective directs light into a sample, often a turbid biological specimen. Only light which is scattered from a depth in the tissue that has equal optical path as the optical path of the reference arm constructively interferes at the detector to provide an electronic signal that represents the optical signal from the sample. This coherence requirement eliminates the need for a confocal pinhole to select the image plane inside the tissue. Optical coherence imaging however, suffers from the same deleterious effect of adjacent scatters as does confocal imaging. This effect is reduced, however, by the same polarization illumination and detection system previously described.

Accordingly, it is the principal object of the present invention to provide improved imaging systems, and especially imaging systems using confocal microscopy, and more especially laser scanning confocal microscopy.

It is a further object of the present invention to provide improved confocal microscopes and especially improved laser scanning confocal microscopes.

It is still further object of the invention to provide improved confocal laser scanning microscopes which provide images of biological tissue, and especially dermatological tissue.

It is a still further object of the inventor to provide improved instruments using optical coherence interferometry.

Briefly described, a system embodying the invention enables viewing of section of a medium. Light is received by and returned from the section and from sites adjacent to the section. The system utilizes a polarization separator, such as Nomarski or Wollaston prism, and a polarization retarder, such as a quarter wavelength plate, both operative on laser light which is incident on the medium and which are disposed successively in the direction of the incident light. The separator and retarder process the incident light into light which is polarized generally circularly and in opposite senses. This oppositely handed polarized light is incident on the medium in the section being imaged at spots which are spaced laterally nominally in the plane of the section of interest providing interference of light returned from the sites (scatterers) adjacent to the section being imaged. The image may be constructed in response to a polarization parameter, for example the degree of circular dichroism, of the return light.

The foregoing and other objects, features and advantages of the invention, as well as presently preferred embodiments thereof, will become more apparent from reading of the following discussion in connection with the accompanying drawings in which.

Figure 1:
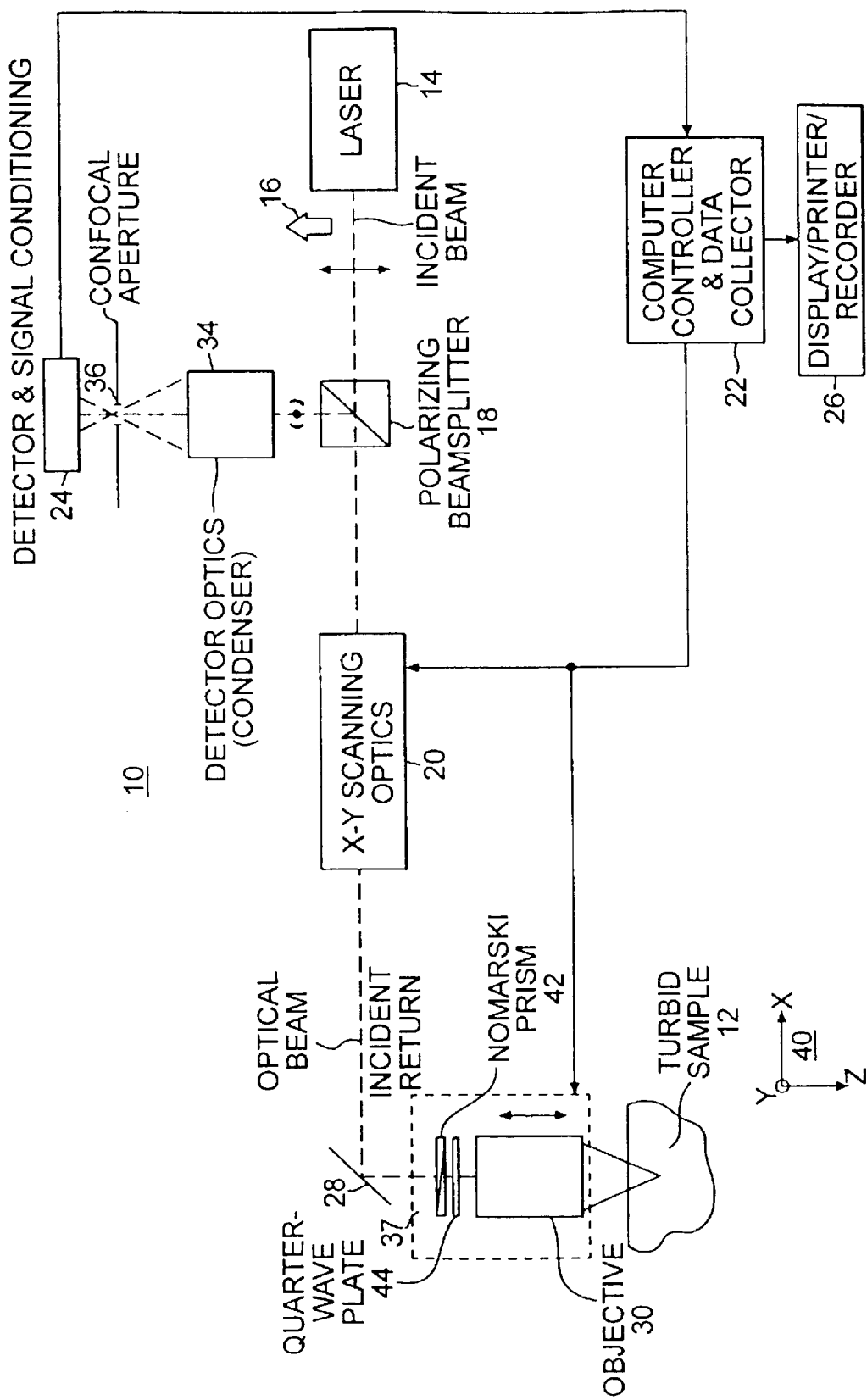
FIG. 1 is a schematic diagram of a laser scanning confocal microscope which embodies the invention.

Referring to FIG. 1, there is shown a confocal laser scanning microscope wherein the beam, which is made incident on and illuminates a turbid sample 12, is obtained from a single, mode laser 14, which in the case where the microscope is used to image a section of dermatological tissue (forming the turbid sample 12), is preferably in the infra-red range. The incident beam from the laser is linearly polarized as indicated by the arrow 16. A polarizing beam spitter 18 passes the incident beam to scanning optics 20.

These scanning optics provide scanning in an X, Y direction, where X and Y are coordinates orthogonal to each other in the image plane. The scanning optics may be an undulating or pivoting mirror and a rotating polygon mirror as in the Vivascope laser scanning confocal microscope referenced above. Orthogonal mirrors may provide the scanning optics, as in the confocal scanning microscope described in the above-referenced publications. The scanning optics is controlled by a computer controller 22 which also collects image data from a photo detector 24 and constructs the image either on a display, printer or a recorder 26.

The incident and return beams are deflected by a mirror 28 toward the sample 12 and pass through an objective lens system 30 to the focal or image plane in the specimen.

Optical polarization processing elements 32 (FIG. 2) are disposed in the beam path ahead of the objective 30. The return light from the image plane is again deflected by the scanning optics 20 and deflected by the beamsplitter 18 through detector optics (a condenser lens system) 34 to the detector. The detector optics focuses the light at the center of a confocal aperture 36. In order to select the image plane, the objective 30 together with the polarization processing optics 32 (which may be an assembly 37) is movable under control of the computer controller 22 in the Z direction which is a direction perpendicular to the X and Y direction as shown at 40. So far described, except for the processing elements, the confocal laser scanning microscope 10 is similar to that described in the referenced article and patent application.

The polarization processing optics 32 is provided by a Wollaston, but preferably a Nomarski, prism 42 and a quarter wave phase retarder or plate 44 which interposes a quarter wave or 90 degrees phase delay at the laser wavelength. This retarder 44 may be a plate of transparent, bi-refringent material such a quartz, calcite, etc. The state of polarization of the incident beam contains polarization components parallel and perpendicular to the optical axis 48 of the upper section 50 of prism 42. For example, linear polarization at 45° is shown at 46 in FIG. 2. The optical axis of the lower section 52 of the prism is orthogonal to the optical axis 48 of the upper section 50. The optical axes are determined by the crystal structure of the prism. Light polarized perpendicular to the optical axis is passed through the prism section without extraordinary refraction. For further and more detailed definition of the optical axis of crystals, see Yariv et al., *"Optical Waves in Crystals"*, published by John Wiley and Sons (1984), especially section 4.2.

Because the incident polarization 46 contains components of polarization parallel to both optical axes of the prism sections. The prism 42 splits or shears the incident beam 56 into two linearly polarized beams, A and B. The axes of polarization for the two beams are parallel to each of the optical axes of the two prisms in the Nomarski's prism. The shear is in a direction transverse to the direction of propagation of the incident beam 56. Both beams pass through a 90° phase retarder with its fast axis 45° to each polarization axis of beams A and B. The beams A and B are focused at spots C and D, respectively in the focal or image plane 58. It will be appreciated that these spots are scanned in X and Y over the image plane in order to provide optical signals from which the image can be constructed, after detection by the detector 24, in the computer 22. Preferably the spots substantially overlap. They are suitable separated by a distance, D/4, where D is the Airy diameter of focal spots formed by the objective 30.

Figure 2:
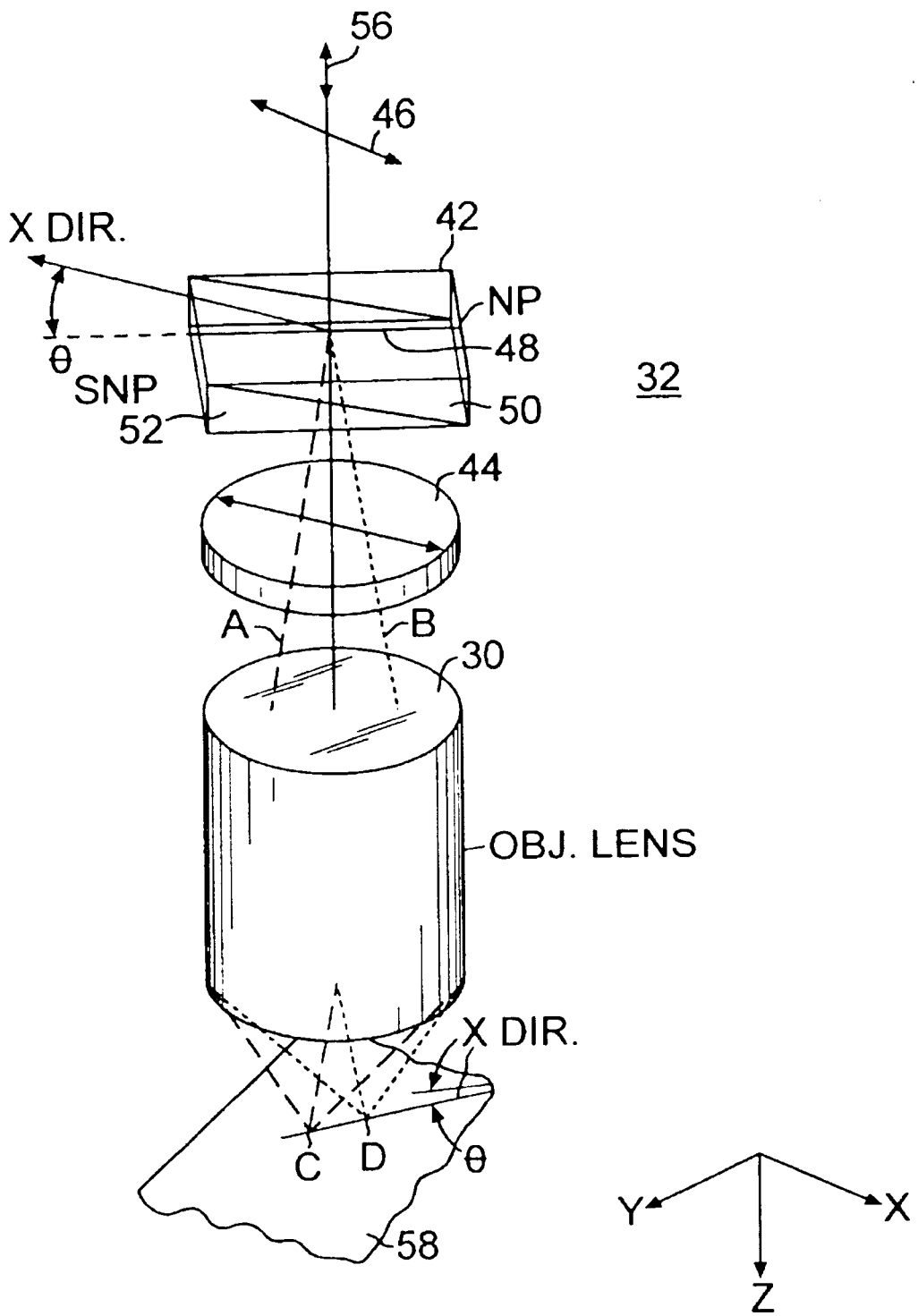
FIG. 2 is a schematic diagram illustrating the polarization processing, in the microscope of FIG. 1, of the incident light and the collection of the return light from an image section which is shown as a focal plane.

The light is returned and collected by the objective 30 and combined inside of the prism 42, and returned as general elliptically polarized beam. The light directed into sample 12 and the light returned from the sample substantially share the same objective 30 as illustrated in FIG. 2. The polarization state of the light returned from the spots C and D depends upon the optical activity and optical retardance, particularly the difference in the average refractive index across the spots C and D. Accordingly, the amount of light from the image plane, which is focused by the condenser 34 and passes through the confocal aperture as the optical signal which is detected by the detector 24 depends upon the amount of polarization rotation, or the differential interference which produces a phase rotation of the polarization vector. Since the polarizing beamsplitter is set to reflect the polarization orthogonal to the incident polarization 16, towards the detector with greatest efficiency, the intensity of illumination at the detector depends upon the rotation and polarization (in effect the degree of elliptical polarization) which is produced by the material in the sample in the image plane.

Because of the quarter wave plate 44, incident beams A and B are orthogonally polarized, particularly, circularly polarized in opposite senses. Therefore, they have a 180° phase difference between them. Both beams illuminate the noise producing scatterers outside (above and below) the focal plane, because of the nearly complete overlap of the two beams outside the focal region. The beams are spaced from each other in the focal plane (in the image section of interest). It is believed that destructive interference of the light returned from the scattering sites outside of the image section of interest reduces distortion, particularly speckle distortion, of the image. However, circular dichroism, optical retardance and other optical activity exists between the light returned from the spots C and D. The optical image forming signal from the focal plane may be diminished due to interference effects, but at a much lower rate than the illumination due to the scatterers away from the focal plane. Accordingly, the optical image signal in the return light, is effectively enhanced, while the noise signal is reduced, thereby reducing the noise and increasing the quality and contrast enhancement in the image from the image plane.

Figure 3:
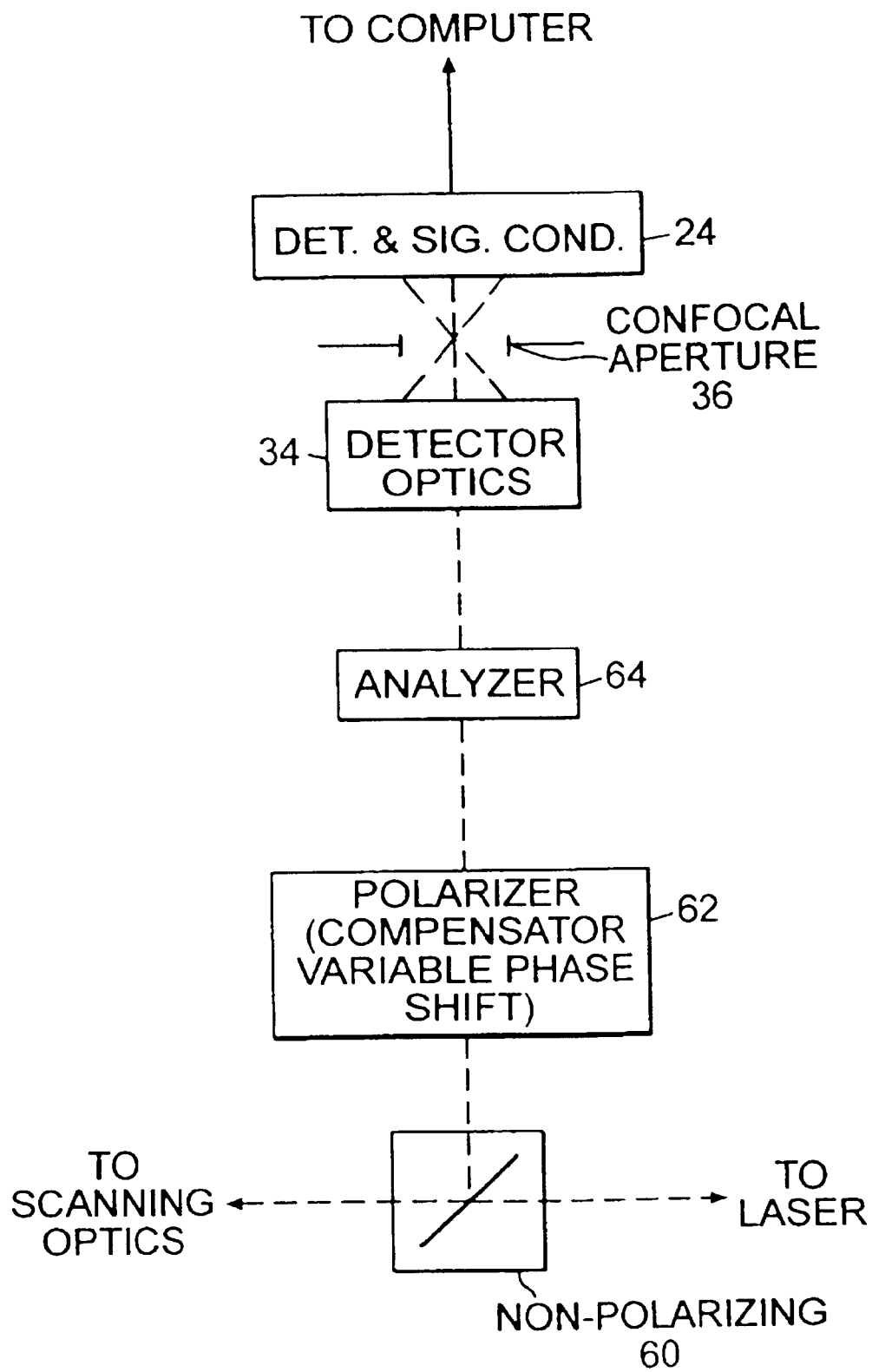
FIG. 3 is a schematic diagram showing the collection optics in the return arm of a confocal microscope system of the type illustrated in FIG. 1 which detects the ellipticity of polarization (providing an ellipsometer) and enables the construction of the image in response thereto.

Referring to FIG. 3, collection optics in accordance with another embodiment of the invention is illustrated. There, a non-polarizing or leaky beamsplitter 60 passes the laser light beam to the scanning optics and deflects the return beam without completely selecting a component of polarization state orthogonal to the incident polarization, as was the case with the polarizing beamsplitter 18. A retarder 62, which may introduce a variable phase shift, effects the polarization of the return beam. This retarder may be similar to a Babinet-Soliel compensator. This retarder can add a phase shift along any axis to convert the return light to a certain polarization state. The amount of polarization shift depends upon the ellipticity of the polarization of the return beam. A analyzer 64 passes the beam from the retarder 62 to the extent that the polarization state of the polarizer is congruent with the polarization of the analyzer. Accordingly, the light or optical signal passed by the analyzer is a function of the ellipticity of the return beam. The return beam is them focused by detector optics 34 at the confocal aperture 36 and then detected by the photo detector 24.

The analyzer and polarizer constitute an ellipsometer. Certain types of optical activity and retardation effectively elliptically polarize the return beam. This is especially the case in biological tissues where the molecular bonds have spiral structure characterizing certain proteins and sugars, which constitute the cells of these tissues. Accordingly the processing of the return light and the detection of the degree of elliptical polarization and ellipse orientation may provide images representing characteristics of biological tissue which are of interest.

Desirably, the photo detector 24 includes amplification and signal conditioning circuits so as to process the electrical signal corresponding to the optical signal for reliable digitization in the computer 22.

Figure 4:
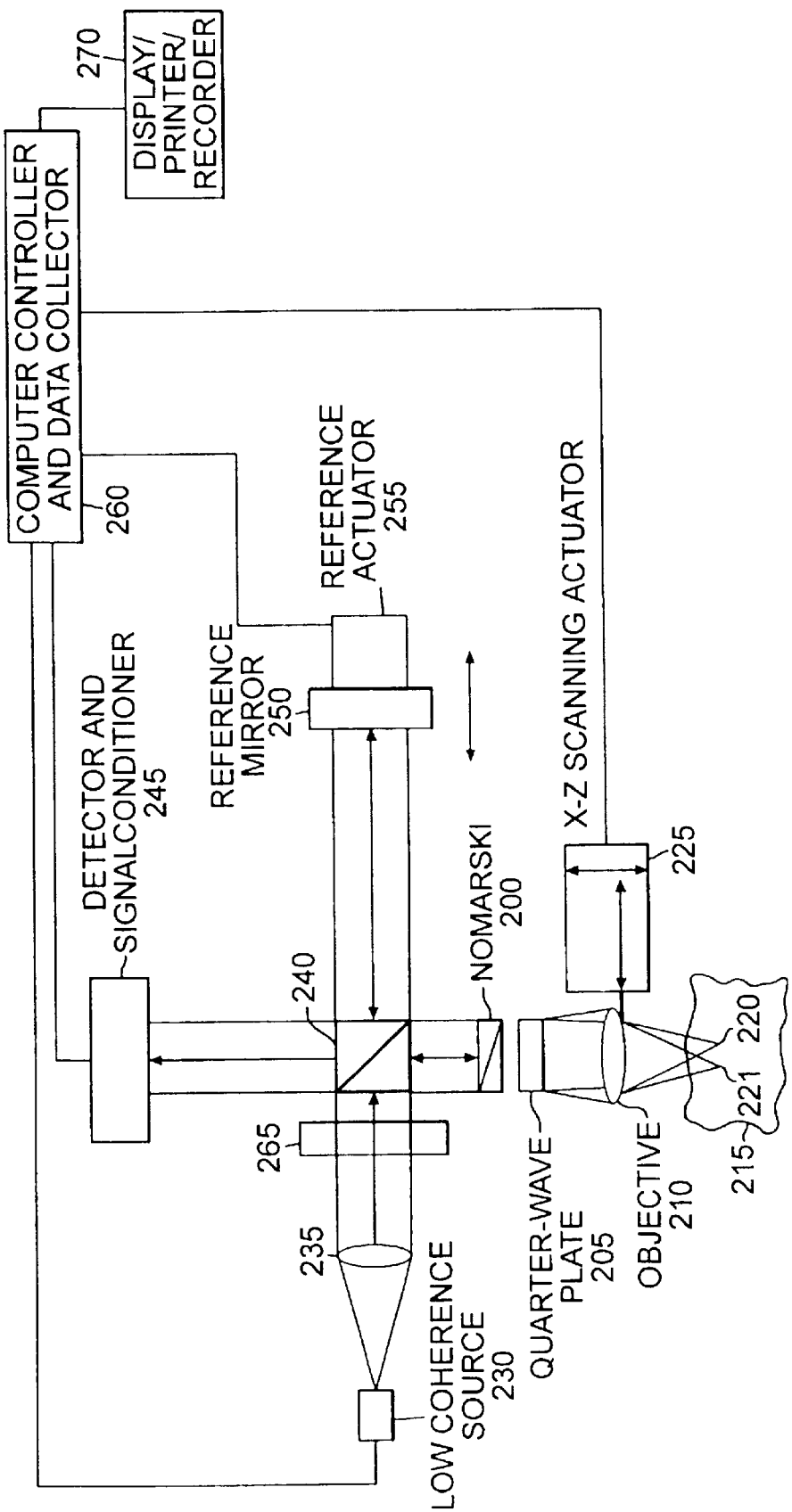
FIG. 4 is a schematic diagram of an optical coherence imaging system embodying the invention.

FIG. 4 shows an optical coherence imaging system with improved imaging. A low coherence optical source 230 such as super luminescent diode or femtosecond laser is collimated by lens 235. A linear polarizer 265 polarizes the incident light. The polarization state is oriented to be in the plane of FIG. 4. The light then passes into beamsplitter 240 which is nominally 50%—50% non-polarizing beamsplitter. A portion of the light is directed to a reference mirror 250. Reference mirror 250 is actuated by transducer 255, which may be a piezo-electric actuator. This actuation modulates the phase of the reference arm light.

A portion of the light is reflected toward the sample, first through the polarization separator 200, which is either a Wollaston or Nomarski prism, and next through a polarization retarder 205, such as a quarter-wave plate. The Nomarski prism is oriented such that the incident polarization is at 45° to the optical axes of the birefringent material which make up the Nomarksi prism. The fast axis of the quarter-wave place is oriented at 45° to the linear polarizations emitted from the Nomarski prism. The quarter-wave plate converts the two orthogonally polarized linear polarizations to orthogonally polarized circular polarizations. The angularly sheared, circularly polarized beams are focused to two spots 220 and 221 by lens 210.

Light scattered from the two spots inside or on the object is collected by lens 210 and angularly combined by the polarization separator 200 and directed towards the beamsplitter 240. A portion of the reference and sample light is directed to a photodetector and signal conditioning circuit 245 which may be a silicon photodiode and amplifier. The portion of the light from both arms incident on the detector that is both parallel and coherent will interfere in a detection arm terminated at the detector 245 and produce a phase modulated electric signal which varies synchronously with the reference mirror position. The amplitude of the modulated signal is proportional to the reflectance of the subject at the point inside the object that has equal optical path as the reference arm to within the coherence length of the source.

As with the confocal system described previously, there are signal contributions from scatterers above and below the surface which equal path as the reference arm. These scatters will produce speckle noise that interferes with the fidelity of the signal. The polarization separator 200 and polarization retarder 205 operate in optical coherence imaging systems in an analogous manner as in the confocal case. The scatters which are outside the surface of equal optical path will be illuminated by the orthogonally polarized spots 220 and 221. The light from these scatterers will be substantially destructively interfere at the detector because the two polarizations have 180° phase difference and illuminate each of the scatters similarly.

Controller 260 controls the scan position of the objective lens 210 through actuator. 225. Controller 260 also controls the position of actuator 255 which controls the position of reference mirror 250. The Controller collects the signal and decodes it with the position information of the actuators and drives a display or recorder 270.

From the foregoing description, it would be apparent that there has been provided an improved imaging system, and especially an imaging system which is especially adapted for providing improved confocal microscopes and especially laser scanning confocal microscopes and which is also applicable for optical coherence tomography or microscopy. Variations and modifications in the herein described system, within the scope of the invention, will undoubtedly suggest themselves to those skilled in the art. Accordingly the foregoing description should be taken as illustrated and not in a limiting sense.

What is claimed is:

1. A system for imaging a section of a medium which receives and returns light from the section and from sites adjacent to the section, said system comprising:

optics for directing light in beams of different polarization in said medium along an imaging plane inside the medium and collecting returned light from the medium, wherein said optics further comprise an objective, and said light directed into the medium and said returned light collected from the medium each share substantially an entirety of said objective;

means for generating an image of the section from said returned light in response to a polarization parameter of said returned light; and wherein said beams are overlapping in said medium outside the imaged section to reduce the part of said returned light from the sites adjacent said section on opposite sides of said section in the direction of propagation of the beams.

2. The system according to claim 1 wherein said beams are incident said medium at spots spaced in at least one direction along an imaging plane.

3. The system according to claim 1 wherein said polarization parameter is the degree of rotation of the polarization of said returned light.

4. The system according to claim 1 wherein said polarization parameter is a function of the differential circular dichroism or optical activity of the returned light.

5. A method for imaging a section of a medium which receives and returns light from the section and from sites adjacent to the section, said method comprising the steps of:

directing light in beams of different polarization in said medium along an imaging plane inside the medium;

collecting returned light from the medium, in which said light directed into said medium and said returned light collected from said medium substantially share an entirety of a common objective;

generating an image of the section from said returned light in response to a polarization parameter of said returned light; and wherein said beams are overlapping in said medium outside the image section to reduce the part of said returned light from the sites adjacent said section on opposite sides of said section in the direction of propagation of said beams.

6. The method according to claim 5 wherein said beams are incident said medium at spots spaced in at least one direction along an imaging plane.

7. The method according to claim 5 wherein said polarization parameter is the degree of rotation of the polarization of said returned light.

8. The method according to claim 5 wherein said polarization parameter is a function of the differential circular dichroism or optical activity of the returned light.

9. An optical coherence imaging system comprising:

a source providing light which is of low coherence;

optics which directs the light from said source into a reference arm and a sample arm to an image plane inside a specimen section;

a polarization separator which shears said light into two beams;

a polarization retarder between said separator and said specimen providing said sheared beams each with an opposite sense of generally orthogonal polarization;

an objective for focusing said two beams at spots spaced from each other in said image plane, which beams overlap in said section outside the vicinity of said image plane and on opposite sides of said plane in the direction of propagation of said beams;

a detection arm into which light is directed by said optics from said reference and sample arms; and means for providing images in response to interference of light in said detection arm which images are enhanced by reduction of light from said vicinity.

10. The system according to claim 9 wherein said optics comprise:

a beam splitter for directing light into a reference arm and a sample arm to an image plane; and a scanner for scanning light of the sample arm in said plane in one or more directions.

11. The system according to claim 9 wherein said separator is one of a Normarski and Wollaston prism.

12. The system according to claim 9 wherein said orthogonal polarization is generally circular polarization.

* * * * *